United States Patent
Yamada (10) Patent No.: US 11,223,741 B2
(45) Date of Patent: Jan. 11, 2022

(54) IMAGE READING APPARATUS

(71) Applicant: BROTHER KOGYO KABUSHIKI KAISHA, Nagoya (JP)

(72) Inventor: Jun Yamada, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/104,069

(22) Filed: Nov. 25, 2020

(65) Prior Publication Data

US 2021/0160398 A1    May 27, 2021

(30) Foreign Application Priority Data

Nov. 26, 2019    (JP) .............................. JP2019-213384

(51) Int. Cl.
*H04N 1/32*        (2006.01)
*H04N 1/00*        (2006.01)
*H04N 1/333*       (2006.01)

(52) U.S. Cl.
CPC ..... *H04N 1/32454* (2013.01); *H04N 1/00737* (2013.01); *H04N 1/00766* (2013.01); *H04N 1/00777* (2013.01); *H04N 1/00782* (2013.01); *H04N 1/33376* (2013.01)

(58) Field of Classification Search
CPC ................................................ H04N 1/32454
USPC ........................................................ 358/1.16
See application file for complete search history.

(56) References Cited

U.S. PATENT DOCUMENTS

2013/0128305 A1*  5/2013  Grabkowitz ....... H04N 1/00973
                                                  358/1.15
2021/0096800 A1*  4/2021  Sato ..................... G06F 3/1238

FOREIGN PATENT DOCUMENTS

JP        2014007677 A     1/2014

* cited by examiner

*Primary Examiner* — Jacky X Zheng
(74) *Attorney, Agent, or Firm* — Scully, Scott, Murphy & Presser, PC (57) ABSTRACT

An image reading apparatus, having a reader device, a user interface, a communication interface, and a controller, is provided. The controller accepts entry of first receiver-identifying information, in response to entry of a first scan command through the user interface, controls the reader device to read an image of an original material, and stores image data for the read image in relation with the first receiver-identifying information in a predetermined memory area. In response to receiving of a second scan command including second receiver-identifying information that corresponds to the first receiver-identifying information by identifying the same receiver from an information processing apparatus by use of a specific protocol, the controller reads out the image data stored in relation with the first receiver-identifying information corresponding to the second receiver-identifying information included in the second scan command from the predetermined memory area, and transmits the image data to the information processing apparatus.

10 Claims, 5 Drawing Sheets

IMAGE READING APPARATUS

CROSS REFERENCE TO RELATED APPLICATION

This application claims priority from Japanese Patent Application No. 2019-213384, filed on Nov. 26, 2019, the entire subject matter of which is incorporated herein by reference.

BACKGROUND

Technical Field

An aspect of the present disclosure is related to an image reading apparatus.

Related Art

A technic for so-called push-scanning function in an image reading system is known. The push-scanning function may enable an image reading apparatus to read an image of an original sheet, generate image data for the image being read, and transmit the generated image data automatically to an information processing apparatus designated by a user. Meanwhile, in the information processing apparatus supporting the push-scanning function, a scanner driver may be running active so that the information processing apparatus may receive the image data transmitted from the image reading apparatus through the scanner driver at all time and store the received image data in a designated memory area automatically. Moreover, for an information processing apparatus that does not support the push-scanning function, a quasi push-scanning function by using a password may be provided.

SUMMARY

In recent years, a technic to control an image reading apparatus by using a standard or basic reader program incorporated generally in an operating system (OS) in an information processing apparatus, without using a scanner driver, has been introduced for practice. According to this technic, the OS may relate the image reading apparatus with the basic reader program in the OS, and once the image reading apparatus is related with the basic reader program, when the image reading apparatus receives a command for image reading from the information processing apparatus, the image reading apparatus may operate to conduct the image reading process under the control of the reader program without using the scanner driver.

Meanwhile, however, the basic reader program included in the OS may not support the push-scanning function mentioned above. Therefore, in order to input a command to cause the image reading apparatus to read an image of an original sheet from the information processing apparatus through the basic reader program in the OS, the user at the information processing apparatus may need to move to the image reading apparatus, set the original sheet on the image reading apparatus, return to the information processing apparatus to enter a start command, which may cause the image reading apparatus to start reading the image, to the image reading apparatus, and move once again to the image reading apparatus to retrieve the original sheet. In this flow of actions, the user may be troubled by moving for multiple times between the information processing apparatus and the image reading apparatus, which may be load to be reduced.

The present disclosure is advantageous in that a quasi push-scanning technic reducible of a user's load to use an image reading apparatus, which is receivable of a scan job from a reader program generally installed within an OS in an information processing apparatus, is provided.

According to an aspect of the present disclosure, an image reading apparatus, having a reader device, a user interface, a communication interface, and a controller configured to accept entry of first receiver-identifying information identifying a receiver of image data, in a state where the first receiver-identifying information is entered, in response to entry of a first scan command through the user interface, the first scan command being configured to cause the reader device to read an image of an original material, control the reader device to read the image of the original material, and store image data for the read image in relation with the entered first receiver-identifying information in a predetermined memory area, is provided. The communication interface is configured to receive a second scan command from an information processing apparatus connected with the image reading apparatus by use of a specific protocol. The second scan command is configured to cause the reader device to read the image of the original material. The specific protocol is a protocol to be used in a basic reader program incorporated in an operating system in the information processing apparatus. The second scan command includes second receiver-identifying information identifying a receiver of image data. The controller is further configured to, in response to the communication interface receiving the second scan command including the second receiver-identifying information that corresponds to the first receiver-identifying information by identifying the same receiver from the information processing apparatus, read out the image data stored in relation with the first receiver-identifying information corresponding to the second receiver-identifying information included in the second scan command from the predetermined memory area, and transmit the image data read out from the predetermined memory area to the information processing apparatus through the communication interface.

DETAILED DESCRIPTION

Hereinafter, with reference to the accompanying drawings, described below will be embodiments of the present disclosure. The present disclosure may be embodied by a multifunction peripheral (MFP) as an image reading apparatus and describes a scanner system, which includes the multifunction peripheral, a personal computer (PC), and a server.

Figure 1:
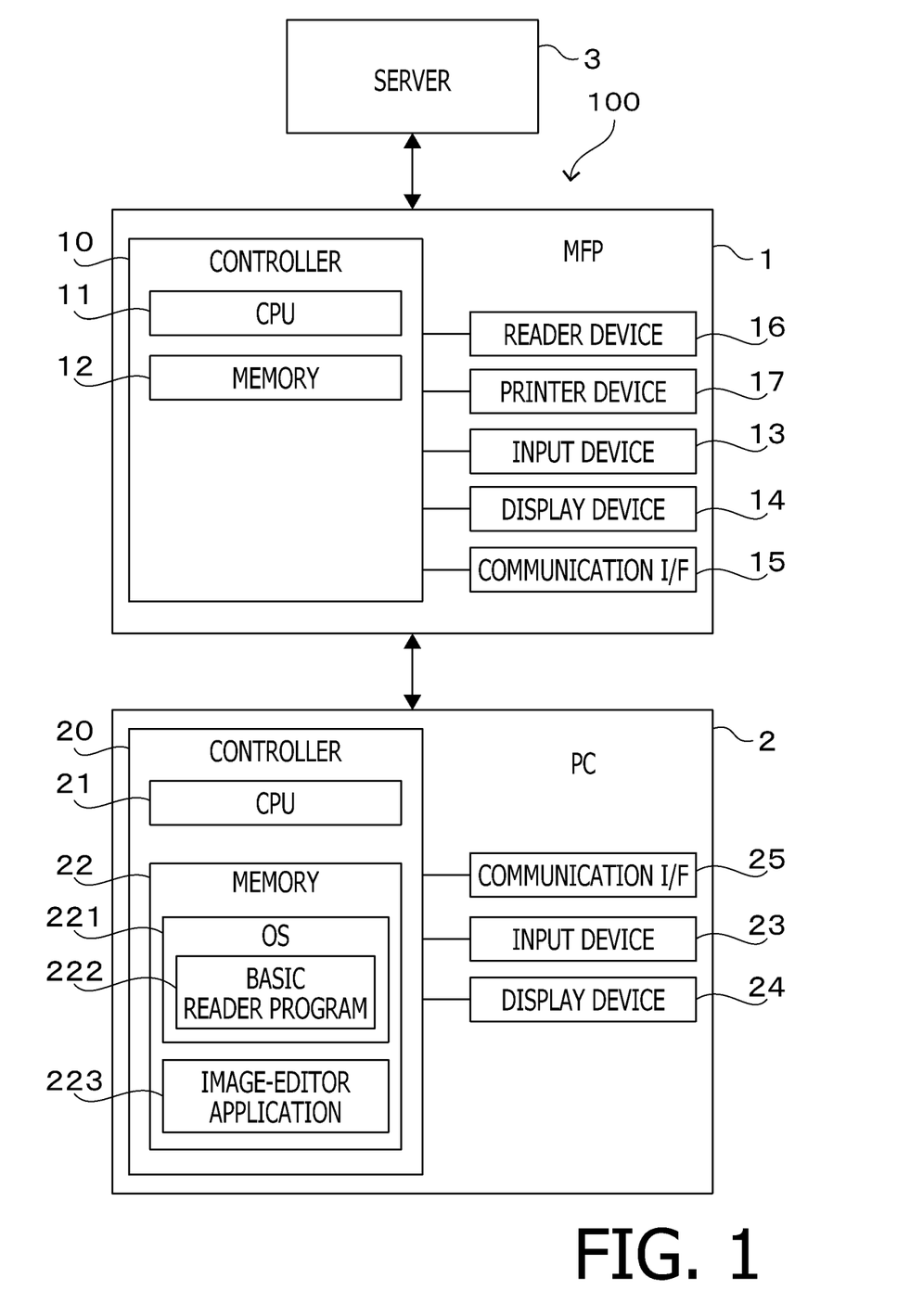
FIG. 1 is a block diagram to illustrate an electrical configuration of a scanner system including a multifunction peripheral machine (MFP) according to an embodiment of the present disclosure.

A scanner system 100 according to the embodiments of the present disclosure includes an MFP 1, a PC 2, and a server 3, which are connected to communicate with one another, as shown in FIG. 1. Quantity of the MFP or the PC may not necessarily be limited to one (1) for each, but the scanner system 100 may include a plurality of MFPs 1 and/or a plurality of PCs 2. Optionally, device(s) additionally to the MFP 1 and the PC 2 may be connected to the scanner system 100.

The MFP 1 has a controller 10 including a CPU 11 and a memory 12. Further, the MFP 1 has an input device 13, a display device 14, a communication interface (I/F) 15, a reader device 16, and a printer device 17, which are connected with the controller 10. The controller 10 may not necessarily be limited to a single hardware device provided to the MFP 1 but may include one or more hardware devices and software programs that are used to control actions and behaviors in the MFP 1.

The CPU 11 may execute processes according to programs called from the memory 12 and/or according to operations by a user. The memory 12 includes various types of memory devices including, for example, a ROM, a RAM, and a non-volatile memory. In the embodiment in the present disclosure, however, the types of the memory devices are not necessarily distinguished. The memory 12 may be used as a work area for the CPU 11 to process data and information and as a memory area to store data and information temporarily. Moreover, the memory 12 may be used as a memory area to store programs, data such as image data, and settings for operations.

The input device 13 may be a device, through which inputting operations by the user may be accepted, and may include buttons and switches. The display device 14 may be a device to display information and may include, for example, a liquid crystal panel. Optionally, a single device, such as a touch panel, having both the displaying function and the inputting function to serve as the input device 13 and the display device 14, may be provided.

The communication I/F 15 includes a hardware device, which enables communication with an external device such as the PC 2 and the server 3. Communication through the communication I/F 15 may either be wired or wireless communication and may be based on any of known methods including, for example, Wi-Fi (registered trademark), Bluetooth (registered trademark), USB, and LAN. Moreover, the communication I/F 15 may support a plurality of communication methods. Further, the communication method between the MFP 1 and the PC 2 may not necessarily be the same as the communication method between the MFP 1 and the server 3 but may be different.

The reader device 16 may include any configuration to read an image of an original, e.g., an original sheet, and obtain image data composing the image. The reader device 16 in the MFP 1 may either be a color image scanner, which may read multicolored images and obtain multicolored image data, or a monochrome image scanner, which may read multicolored or monochrome images and obtain monochrome image data.

The printer device 17 may include any configuration to form an image on a sheet. The printer device 17 may form an image in, for example, inkjet-printing, electro-photographic printing, or in any other printing technic. The printer device 17 may either be a device capable of forming multicolored images or a device capable of forming monochrome images alone.

The PC 2 in the present embodiment has a controller 20, which includes a CPU 21 and a memory 22, and is connectable with the MFP 1. The PC 2 further has an input device 23, a display device 24, and a communication I/F 25, which are electrically connected with the controller 20. The controller 20 may not necessarily be limited to a single hardware device provided to the PC 2 but may include one or more hardware devices and software programs that are used to control actions and behaviors in the PC 2.

The CPU 21 may execute processes according to programs called from the memory 22 and/or according to operations by a user. The memory 22 may be used as a work area for the CPU 21 to process data and information and as a memory area to store data and information temporarily. Moreover, the memory 22 may be used as a memory area to store programs, data such as image data, and settings for operations. For example, the memory 22 may store an OS 221 and an image-editor application 223, which is an application program to edit an image having been read. The image-editor application 223 may receive input of a read command to the scanner and transmit the read command to a specified scanner, e.g., the MFP 1. Optionally, the image-editor application 223 may have a function to display image data obtained from the scanner.

The input device 23 may be a device, through which inputting operations by the user may be entered, and may include a keyboard and/or a mouse. The display device 24 may be a device to display information and may include, for example, a liquid crystal panel. Optionally, a single device, such as a touch panel, having both the displaying function and the inputting function to serve as the input device 23 and the display device 24, may be provided.

The communication I/F 25 may include a hardware device, which enables communication with an external device such as the MFP 1. Communication through the communication I/F 25 may either be wired or wireless communication and may be based on any of technical standards including, for example, Wi-Fi (registered trademark), Bluetooth (registered trademark), USB, and LAN.

The server 3 may be a storage server having a plurality of storage areas, each of which is assigned to a registered user to store a variety of types of data related to the user. The server 3 may be provided to the LAN, to which the MFP 1 is connected, or may be a cloud server connectable through the Internet. The server 3 includes a CPU, a memory, and a communication I/F, which are not shown.

In recent years, a so-called driverless reading technology, which enables transmission of a read command from one apparatus to another apparatus, e.g., from an information processing apparatus to an image reading apparatus, without installing a scanner driver in the information processing apparatus while an OS in the PC includes a basic reader program, has been introduced. The basic reader program included in the OS installed in the information processing apparatus may provide a reading function, which enables the information processing apparatus to accept input of the read command. In the PC 2 in the present embodiment, as shown in FIG. 1, the OS 221 including a basic reader program 222 is installed in the memory 22. The OS 221 may be, for example, Windows (registered trademark), macOS (registered trademark), or Linux (registered trademark). The basic reader program 222 may be a basic program to execute processes that are related to reading of images and may be adapted to operate with multiple models of scanners provided by multiple manufacturers. The basic reader program 222 may be, for example, AirPrint (registered trademark).

In order to cause an apparatus, such as a scanner, to read an image by the read command through the basic reader program 222, it is necessary that the apparatus is registered by the OS 221. Therefore, when the PC 2 receives a registration command to register a new apparatus in the OS 221, the PC 2 may output a search signal to search for the new apparatus connectable with the PC 2 and, when the PC 2 receives a reply from the new apparatus, the PC 2 may output an inquiry signal for information concerning ability of the new apparatus. The apparatus replying to the inquiry correctly is allowed to be registered in the OS 221. The commands from the basic reader program 222 may be output in accordance with Internet Printing Protocol (IPP).

Once the MFP 1 is registered in the OS 221, for example, the image-editor application 223 may receive a read command, which may cause the MFP 1 to read an image, from the basic reader program 222. The image-editor application 223 receiving the read command from the basic reader program 222 may return a scan job based on the read command to the basic reader program 222. As the scan job from the image-editor application 223 is input in the basic reader program 222, the basic reader program 222 may transmit the scan job from the PC 2 to the MFP 1 by use of IPP. The MFP 1 receiving the scan job may generate image data and return the image data to the PC 2.

Meanwhile, the basic reader program 222 may not necessarily be open to receive the image data from the MFP 1 at all time. In other words, the basic program 222 in the PC 2 may not support a push-scanning function. In this regard, the scanner system 100 in the present embodiment is enabled to conduct reading an image and transmitting image data based on the read image, which substantially equates the push-scanning function (i.e., quasi push-scanning function), using the basic reader program 222 not supporting the push-scanning function.

Figure 2:
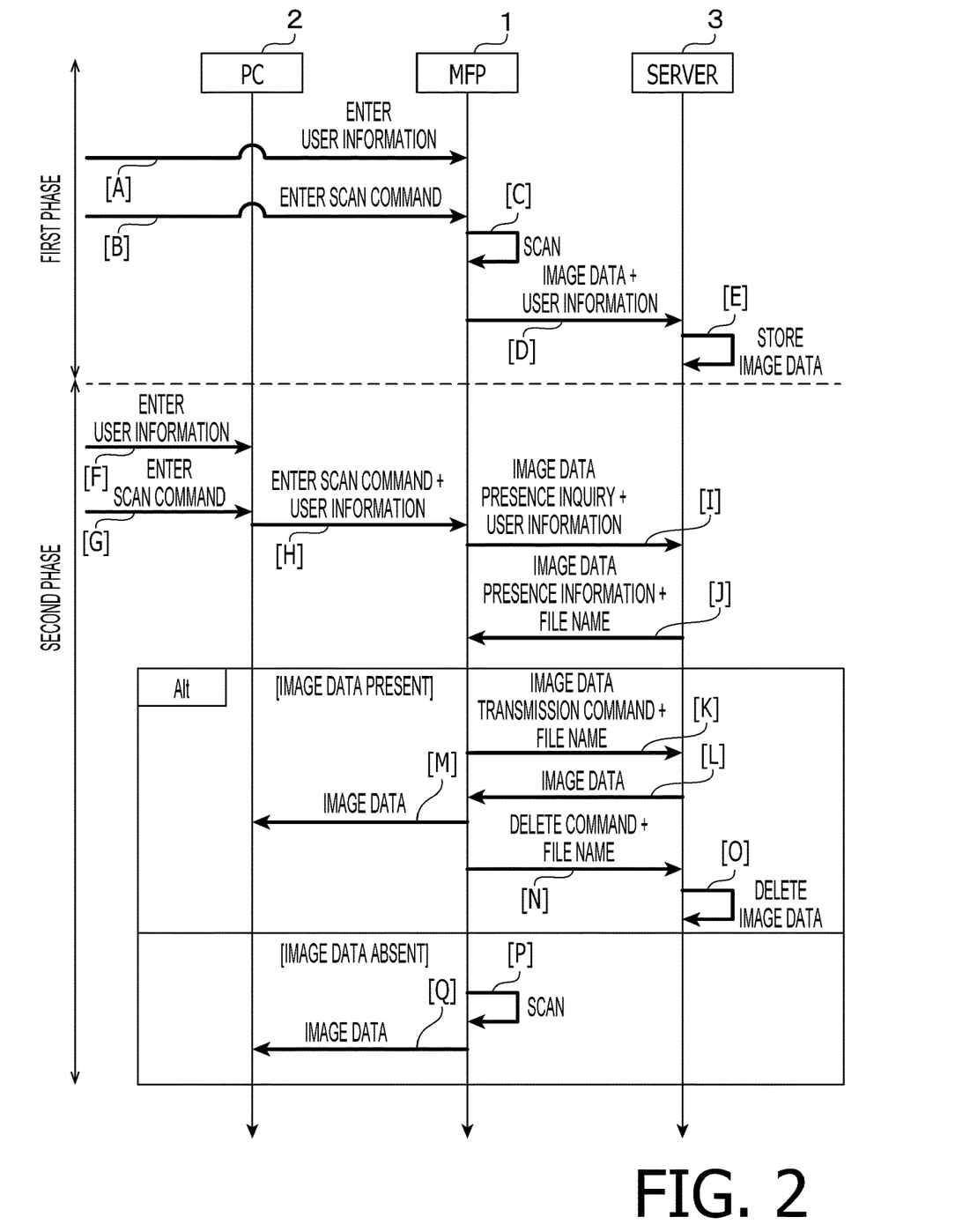
FIG. 2 is a ladder chart to illustrate a sequence of actions in a scan job to be executed in the scanner system according to the embodiment of the present disclosure.

FIG. 2 is a ladder chart to illustrate a sequence of steps in a scan job, including reading of an image and transmission of image data generated from the image, input through the basic reader program 222 in the PC 2 in the scan system 100 according to the present embodiment. Each of the steps in the ladder chart generally represents a process to be executed by one of the CPUs, i.e., the CPU 11 in the MFP 1, the CPU 21 in the PC 2, or the CPU in the server 3, acting in compliance with commands described in the programs stored in the memory therein. The processes to be executed by the CPUs 11, 21 may include control over hardware devices using APIs in the OSes. Meanwhile, in the following description, explicit involvement of the OSes in the actions may be omitted.

The procedure to execute a scan job in the present embodiment may be divided into two (2) phases: a first phase, in which the MFP 1 reads an image of an original material; and a second phase, in which image data of the image of the original material is transmitted to the PC 2.

First, described below will be a procedure in the first phase. In the first phase, user information may be entered in the MFP 1 by a user (process [A]). The user information may include, for example, user ID to identify the user who may receive image data and a password for the user to log in the MFP 1. When the user information is entered, the MFP 1 may authenticate the user based on the entered user information. On condition that the user is authenticated, the user may be allowed to enter more information including a scan command. The user information may be entered through, for example, the input device 13 or wireless communication such as NFC. Meanwhile, entry of a password or authentication of a user may not necessarily be required, but, for example, users may be registered in the MFP 1 in advance, and a list of the registered users may be displayed to the user through the display device 14 so that the user may select one of the listed users.

After the entry of the user information, the MFP 1 may accept entry of a scan command (process [B]). The MFP 1 is operable in one of a first mode, in which the MFP 1 conducts actions to process a scan job provided from a basic reader program 222, and a second mode, in which the MFP 1 conducts a regular scanning action. The first mode and the second mode may be switched by an operation by the user through the input device 13. FIG. 2 illustrates actions in the first mode, and the scan command entered from the PC 2 and accepted by the MFP 1 in the process [B] is a scan command in the first mode.

The MFP 1 accepting the entry of the scan command in the first mode may start scanning an image of the original material set on the MFP 1 by the user and generate image data based on the scanned image (process [C]). Optionally, the user may set the original material on the MFP 1 either before the entry of the user information or after the entry of the user information but before the entry of the scan command Still optionally, if the MFP 1 is configured to wait for the original material to be set on the MFP 1 after the entry of the scan command, the user may set the original material on the MFP 1 after the entry of the scan command.

After scanning the image of the original material, and after the image data is generated, the MFP 1 may transmit the image data to the server 3 (process [D]). When transmitted from the MFP 1 to the server 3, information concerning the user information entered previously in process [A] is correlated with the image data and transmitted to the server 3 along with the image data. The information transmitted in relation with the image data may indicate the user being the receiver of the image data. The information may not necessarily be a duplicate of the entered user information but may be information based on the entered user information or information extracted from the entered user information.

The server 3 receiving the image data from the MFP 1 may refer to the user information related with the image data and store the image data in a memory area assigned to the user (process [E]). After the image data is completely stored, the server 3 may inform the MFP 1 that the image data is stored. Thus, the image data of the image having been read and generated by the MFP 1 may be stored temporarily in the server 3, and the first phase ends thereat. If no memory area in the memory device in the server 3 is assigned to the user, the server 3 may assign a memory area to the user or may refuse the image data as an error. Optionally, the server 3 may have a database to store information indicating the relation between the image data and the user information. In this arrangement, the relation between the image data and the user information may be administrated through the database; therefore, the server 3 may not necessarily assign a memory area to each user.

Although not shown in FIG. 2, when the MFP 1 accepts entry of the scan command in the second mode, the MFP 1 may start scanning the image of the original material, generate image data for the image, and store the image data to a memory area designated by the user. The user may designate the memory area to store the image data in the memory 12 either in the MFP 1 or in an external memory device outside the MFP 1.

Next, a procedure in the second phase will be described. In the second phase, entry of the user information may be accepted in the PC 2 through the OS 221 (process [F]). The user information accepted in the PC 2 may not necessarily be in the same format as the user information accepted in the MFP 1 in process [A] as long as the user information identifies the same user, in other words, as long as the PC 2 is provided with information that indicates the relation between the user information accepted in the PC 2 and the user information accepted in the MFP 1. When the user information is entered, the PC 2 may authenticate the user based on the user information. On condition that the user is authenticated, the PC 1 may accept entry of a command, e.g., a scan command, from the user.

The scan command being a command to cause the MFP 1 to read an image may be accepted in the PC 2 through the image-editor application 223. The PC 2 accepting the scan command through the image-editor application 223 may input a scan job from the image-editor application 223, through the OS 221, to the basic reader program 222 (process [G]).

As the scan job is input in the basic reader program 222, the basic reader program 222 may generate a command prescribed for the scan job, and the PC 2 may transmit a scan command including the prescribed command to the MFP 1 through IPP (process [H]). The scan command transmitted to the MFP 1 may include the user information accepted in process [F].

The MFP 1 receiving the scan command from the PC 2 may transmit an image data presence inquiry, requesting for information that indicates presence or absence of the image data, to the server 3 (process [I]). The image data presence inquiry includes the user information included in the scan command from the PC 2.

The server 3 receiving the image data presence inquiry from the MFP 1 may respond to the MFP 1 by transmitting image data presence information indicating presence or absence of the image data related with the user who is identified by the user information included in the image data presence inquiry (process [J]). Namely, when the image data in relation with the user information included in the image data presence inquiry is stored in the server 3, the server 3 may transmit image data presence information, which indicates presence of the image data, to the PC 2. The image data presence information indicating presence of the image data may include a file name of the image data. When the server 3 stores more than one unit of image data, the image data presence information may include all of the names of the plurality of image data units. On the other hand, when the server 3 stores no image data related with the user information included in the image data presence inquiry, the server 3 may transmit image data presence information indicating absence of image data to the PC 2. The image data presence information indicating absence of image data includes no file name.

The MFP 1 receiving the image data presence information indicating presence of the image data may transmit an image data transmission command, requesting for transmission of the image data, to the server 3 (process [K]). The image data transmission command includes at least one file name, which is included in the image data presence information. In the present embodiment, the MFP 1 requests for transmission of all of the image data units, whose file names are included in the image data presence information. Optionally, not all but one or some of image data units whose file name(s) is/are included in the image data presence information may be selectively requested. When one or more image data units is/are selectively requested, the image data transmission command may include one or more file names of the one or more selected image data units.

The server 3 may read out image data corresponding to the file name(s) included in the image data transmission request, i.e., the image data related with the user information accepted in process [F], from the memory and transmit the image data to the MFP 1 (process [L]).

The MFP 1 receiving the image data from the server 3 may transmit the received image data to the PC 2 (process [M]). Thus, the PC 2 may obtain the image data for the image of the original material read by the MFP 1. In this regard, in a case where the image of the original material was read in the past, the MFP 1 may, without reading the image of the original material at this stage, obtain the image data for the image having been read in the past from the server 3 and transmit the obtained image data to the PC 2 in reply to the scan command from the PC 2.

After transmission of the image data to the PC 2 is completed, the MFP 1 may transmit a delete command, commanding the server 3 to delete the image data, to the server 3 (process [N]). The delete command includes the file name(s) of the image data transmitted to the PC 2. The server 3 receiving the delete command may delete the image data corresponding to the file name(s) included in the delete command from the memory (process [O]). After the image data is completely deleted, the server 3 may notify the MFP 1 of the completion. Thus, the PC 2 may receive the image data of the image(s) having been read earlier by the MFP 1. The second phase ends thereat.

On the other hand, when the MFP 1 receives the image data presence information indicating absence of the image data from the server 3, the MFP 1 may start scanning the image of the original material set on the MFP 1 by the user and generate image data for the image having been scanned (process [P]). In other words, in a case where no image of the original material was scanned earlier, the MFP 1 processes the scan command as a scan command for pull-scanning, which may be conducted while the original material is set on the MFP 1. The MFP 1 may transmit the generated image data of the scanned image to the PC 2 (process Q). Thus, the PC 2 may receive the image data for the image of the original material read by the MFP 1. The second phase ends thereat.

In the latter case where the PC 2 receives the image data presence information indicating absence of the image data, and if the MFP 1 is distanced from the PC 2, the user may need to move to the MFP 1 to set the original material before entering the scan command through the PC 2. Moreover, after setting the original material on the MFP 1, the user may need to return to the PC 2, and after entering the scan command, the user may need to move to the MFP 1 to retrieve the original material. In other words, the user may need to move to the MFP 1 twice. On the other hand, in the former case where the PC 2 receives the image data presence information indicating presence of the image data, the user may need to move to the MFP 1 once in the first phase. However, once the image of the original material is read by the MFP 1, the user may return to the PC 2 along with the original material in the user's hand and enter the scan command through the PC 2. Therefore, the user may not move once again to the MFP 1 in the second phase. In other words, the user may move only once to the MFP 1 to obtain the image data.

Meanwhile, in the latter case where the PC 2 receives the image data presence information indicating absence of the image data, and if the MFP 1 is located in the vicinity of the PC 2, the burden on the user to move twice to the MFP 1 may be cleared or reduced. The user may easily obtain the image data by setting the original material on the MFP 1 and entering the scan command through the PC 2, without entering the user information (process [A]) or the scan command to the MFP 1 (process [B]). In this regard, the user may find the processes [P]-[Q] useful.

Next, among the actions in the scan job as shown in FIG. 2, steps to be conducted in the MFP 1 will be described below. In particular, the steps to be conducted in the MFP 1 may be categorized into a scan-storing process, which may be conducted by the CPU 11 in the first phase, and an image data outputting process, which may be conducted by the CPU 11 in the second phase.

Figure 3:
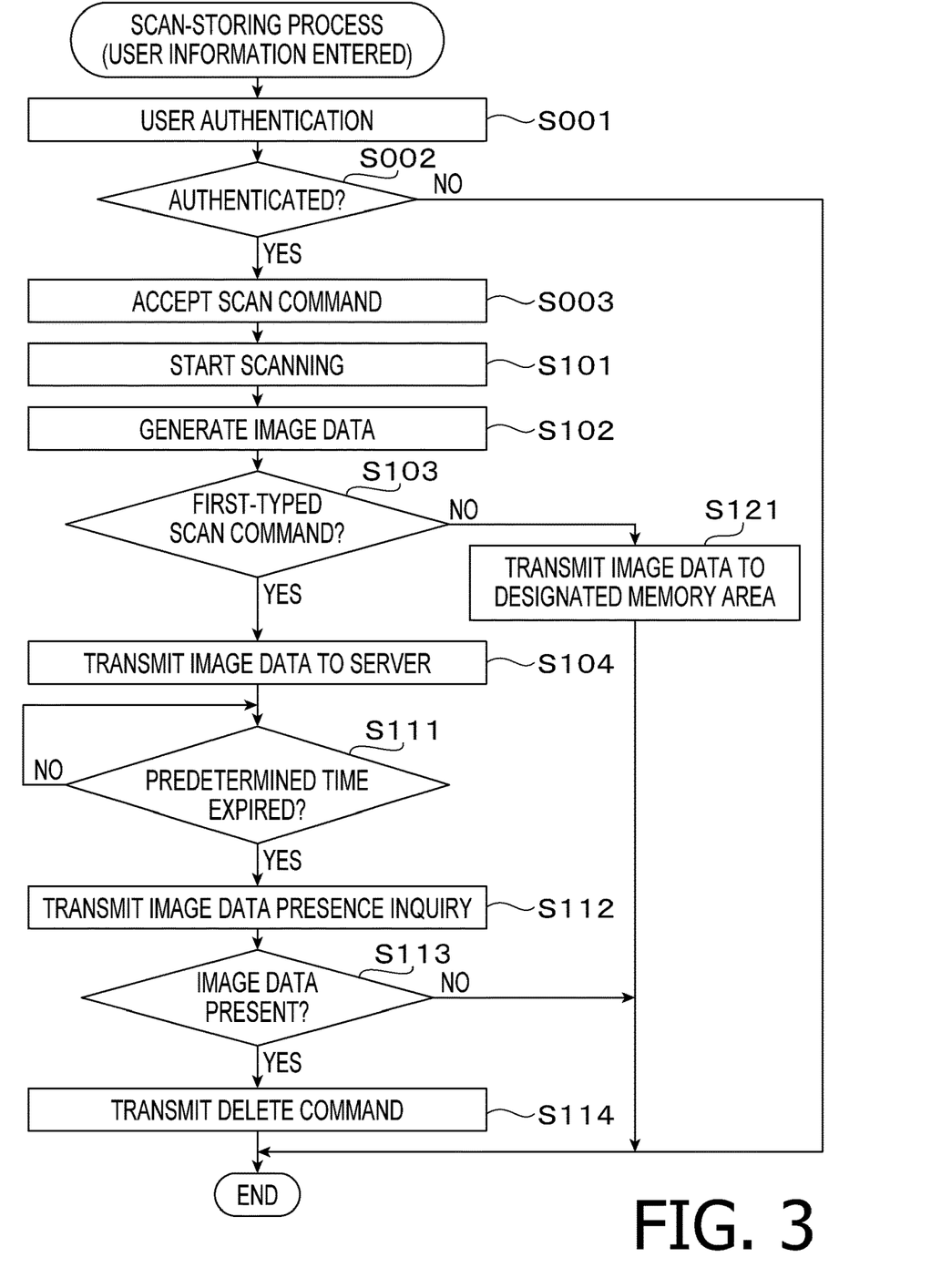
FIG. 3 is a flowchart to illustrate flows of steps in a scan-job storing process to be executed in the image reading apparatus according to the embodiment of the present disclosure.

First, the scan-storing process will be described with reference to FIG. 3. The scan-storing process may be conducted in response to entry of the user information through the input device 13.

As the scan-storing process starts, in S001, the CPU 11 authenticates the user based on the entered user information. Authentication of the user may be conducted by, for example, comparing a combination of user ID and a password registered in advance with a combination of user ID and a password included in the entered user information. Optionally, the authentication of the user may not necessarily be conducted based on the information stored in the MFP 1 but may be, for example, conducted by an external device such as an authentication server.

Following S001, in S002, the CPU 11 determines whether the user is authenticated. If the authentication of the user fails (S002: NO), the CPU 11 terminates the scan-storing process. If the user is successfully authenticated (S002: YES), in S003, the CPU 11 allows the user's operation to enter the scan command through the input device 13.

A scan command that may be entered by a user's operation and accepted in the MFP 1 includes a first-typed scan command, which may cause the MFP 1 to conduct a reading action to read an image of an original material according to the procedure for the scan job described above, and a second-typed scan command, which may cause the MFP 1 to conduct a reading action to read an image of an original material according to a known procedure different from the above-described procedure. In other words, the first-typed scan command is the scan command indicated as process [B] in FIG. 2. The MFP 1 may determine whether the entered scan command is the first-typed scan command or the second-typed scan command by, for example, providing buttons, one for the first-typed scan command and the other for the second-typed scan command, and determining which one of the buttons is operated by the user. For another example, the MFP 1 may allow the user to select between the first type and the second type before entering the scan command.

The CPU 11 accepting the entry of the scan command may, in S101, control the reader device 16 to conduct a reading action to read an image of an original material set on an original material placement bin according to parameters set by the user though the input device 13. If no original material is set on the original material placement bin, the MFP 1 may either wait until an original material is set or determine that an error occurred and abort the reading action. In S102, the CPU 11 obtains a result of the reading action and generate image data for the image having been read.

After generating the image data, in S103, the CPU 11 determines whether the scan command entered is the first-typed scan command. When the scan command is the first-typed scan command (S103: YES), in S104, the CPU 11 transmits the image data generated in S102, along with the user information entered in advance, to the server 3. The server 3 receiving the image data may store the image data in the memory and transmit a completion acknowledgement to the MFP 1. The MFP 1 may receive the completion acknowledgement from the server 3.

Following S104, in S111, the CPU 11 determines whether a predetermined time expires since receiving of the completion acknowledgement. If the predetermined time is not expired (S111: NO), the CPU 11 waits until the predetermined time expires. When the predetermined time expires (S111: YES), in S112, the CPU 11 transmits the image data presence inquiry, along with the user information transmitted in S104 and the file name(s) of the image data, to the server 3. The server 3 receiving the image data presence inquiry may transmit a reply, indicating whether the image data with the inquired file name(s) is/are stored therein, to the MFP 1. The MFP 1 may receive the reply from the server 3.

After receiving the reply indicating presence or absence of the image data from the server 3, in S113, the CPU 11 determines whether the image data transmitted in S104 is stored in the server 3. If the image data is stored in the server 3 (S113: YES), in S114, the CPU 11 transmits a delete command for the image data, along with the user information transmitted in S104 and the file name(s) of the image data, to the server 3. The server 3 receiving the delete command for the image data may delete the image data, i.e., the image data related with the user information transmitted along with the delete command having the file name(s) transmitted along with the delete command, from the memory and transmit a delete confirmation indicating that the image is deleted to the MFP 1. The MFP 1 may receive the delete confirmation. The image data remaining in the server 3 after the predetermined time may be less likely to be called from the MFP 1. In this regard, the image data remaining in the server 3 may be deleted after the predetermined time to reduce a load on the memory of the server 3. After receiving the delete confirmation, or when the image data is not stored in the server 3 (S113: NO), the CPU 11 ends the scan-storing process.

In S103, on the other hand, when the entered scan command is the second-typed scan command (S103: NO), in S121, the CPU 11 transmits the image data to a memory area, which is or was in advance designated by the user through the input device 13. In this flow, the CPU 11 may not transmit the user information along with the image data to the designated memory area. After S121, the CPU 11 ends the scan-storing process.

Figure 4:
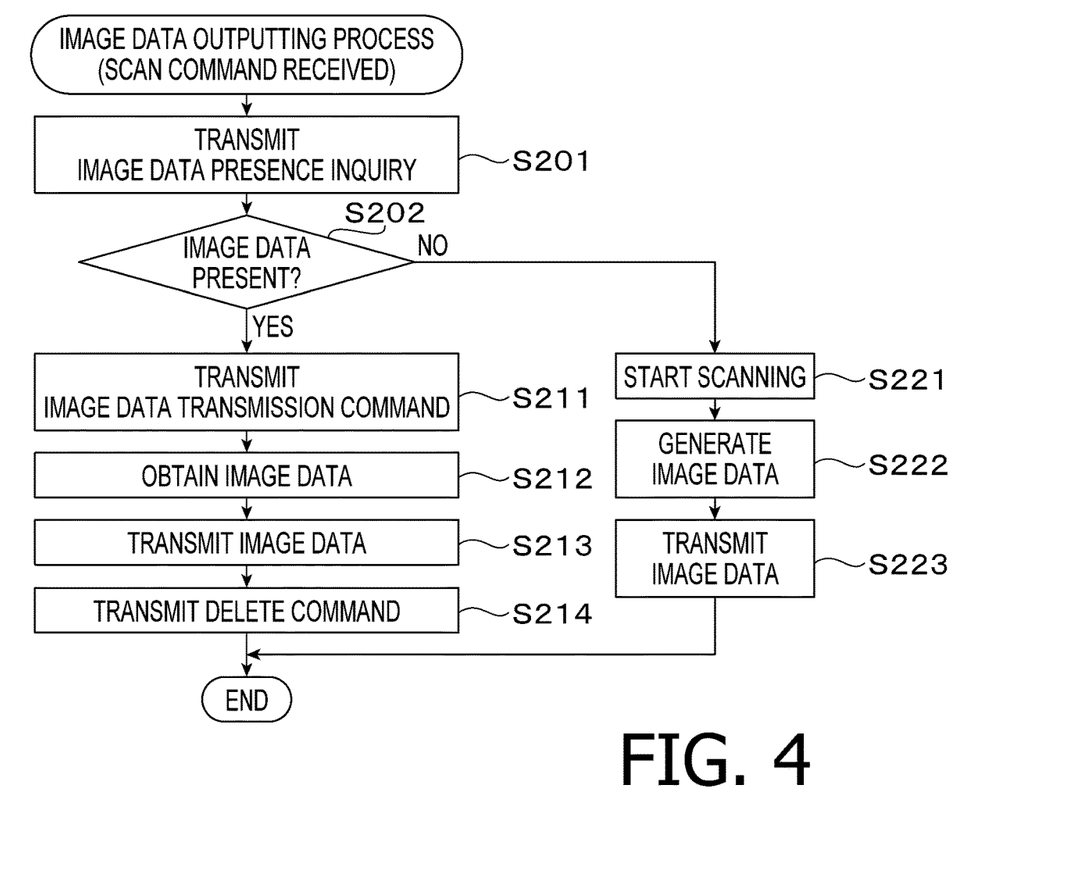
FIG. 4 is a flowchart to illustrate flows of steps in an image data outputting process to be executed in the image reading apparatus according to the embodiment of the present disclosure.

Next, the image data outputting process will be described with reference to FIG. 4. The image data outputting process may be conducted in response to receiving of the scan command from the PC 2 through the communication I/F 25. The MFP 1 receiving the scan command may receive the user information along with the scan command. The MFP 1 may receive the scan command, for example, transmitted from the PC 2 in process [H] shown in FIG. 2. The following paragraphs describe an example based on the scan command transmitted from the PC 2.

As the image data outputting process starts, in S201, the CPU 11 transmits the image data presence inquiry, along with the received user information, to the server 3. The server 3 receiving the image data presence inquiry may transmit a reply, indicating whether the image data related with the user information transmitted along with the image data presence inquiry is stored, to the MFP 1. The MFP 1 may receive the reply from the server 3. When the image data is stored in the server 3, the server 3 may transmit file name(s) of the image data, along with the reply, to the MFP 1.

Based on the received reply, in S202, the CPU 11 determines whether the server 3 stores the image data related with the user information transmitted in S201. If the server 3 stores the image data (S202: YES), in S211, the CPU 11 transmits the image data transmission command, along with the file name(s) received together with the reply from the server 3, to the server 3. The server 3 receiving the image data transmission command may transmit the image data having the file name(s), which was/were transmitted along with the image data transmission command, to the MFP 1. In S212, the MFP 1 receiving the image data from the server 3 may thus obtain the image data.

After obtaining the image data, in S213, the CPU 11 transmits the image data to the PC 2 being the sender of the scan command. The PC 2 receiving the image data may obtain the image data for the image, which was read earlier. The PC 2 may transmit a receipt confirmation, indicating that the image data is received, to the MFP 1. The MFP 1 may receive the receipt confirmation.

After receiving the receipt confirmation, in S214, the CPU 11 transmits the delete command for the image data, along with the file name(s) transmitted in S211, to the server 3. The server 3 receiving the delete command may delete the image data having the file name(s) transmitted along with the delete command and transmit a delete confirmation indicating that the image data is deleted to the MFP 1. The MFP 1 may receive the delete confirmation. After receiving the delete confirmation, the MFP 1 ends the image data outputting process.

In S202, on the other hand, if the image data is not stored in the server 3 (S202: NO), in S221, the CPU 11 controls the reader device 16 to conduct a reading action to read an image of an original material set on the original material placement bin according to parameters included in the received scan command. If no original material is set on the original material placement bin, the MFP 1 may either wait until an original material is set or determine that an error occurred and abort the reading action. In S222, the CPU 11 obtains a result of the reading action and generate image data for the image having been read.

After generating the image data, in S223, the CPU 11 transmits the generated image data to the PC 2 being the sender of the scan command. The PC 2 receiving the image data may transmit a receipt confirmation to the MFP 1. The MFP 1 may receive the receipt confirmation. After receiving the receipt confirmation, the MFP 1 ends the image data outputting process.

It may be noted that the scan command to be received by the MFP 1 may not necessarily be limited to the scan command entered through the basic reader program 222 but may include a scan command entered through a scanner driver installed in the MFP 1. In the image data outputting process described above, whether the scan command received from the PC 2 is a scan command entered through the basic reader program 222 or a scanner driver entered through the scanner driver is not considered. Meanwhile, when the scan command is entered through the scanner driver, it may be likely that the scan command is a command for push-scanning. Therefore, it may be less likely that the MFP 1 takes the procedure shown in FIG. 2. In this regard, the flows of steps to be conducted in the image data outputting process may be split depending on a determination whether the received scan command is a scan command entered through the basic reader program 222 or not.

Figure 5:
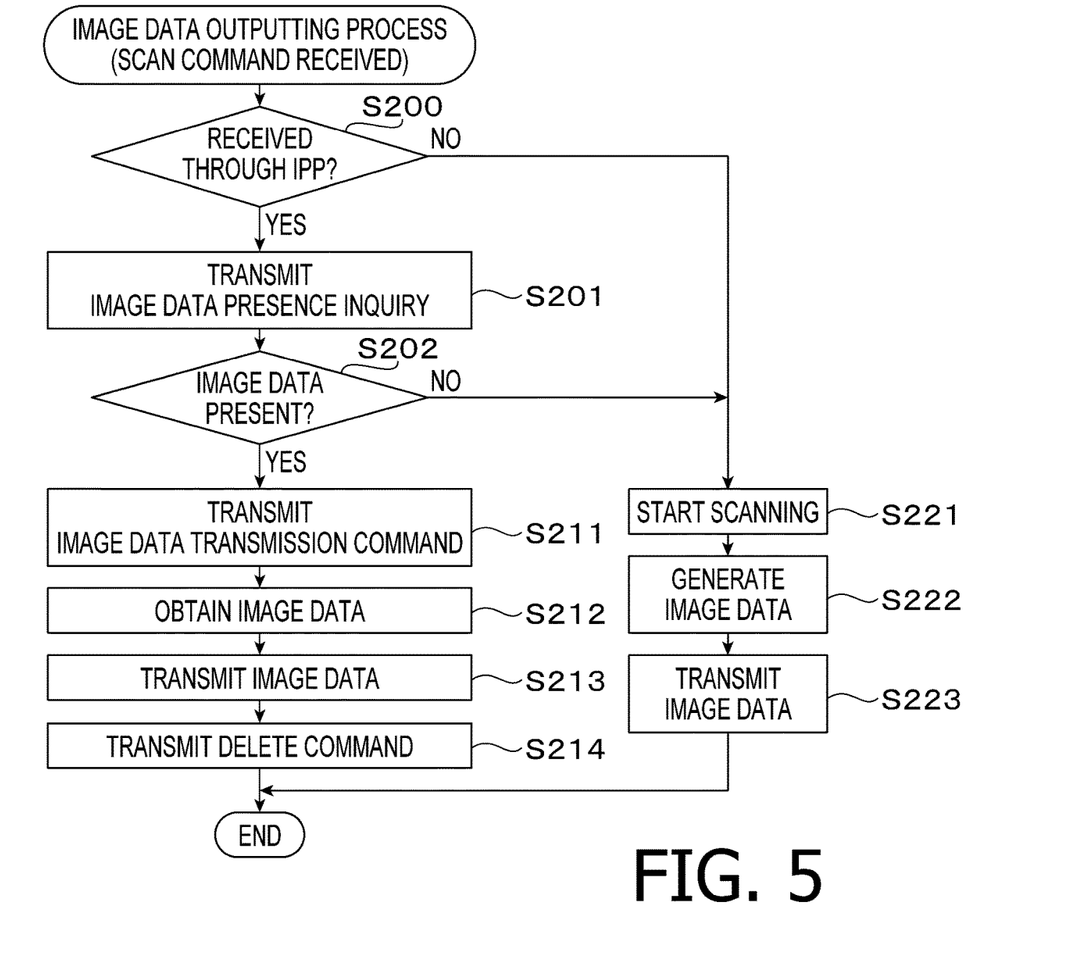
FIG. 5 is a flowchart to illustrate flows of steps in a scan-job storing process to be executed in the image reading apparatus according to a modified example of the embodiment of the present disclosure.

FIG. 5 shows a modified example of the image data outputting process, in which the steps to be conducted are split into the different flows based on the type of the received scan command. In FIG. 5, the steps that are the same as those in the image data outputting process in FIG. 4 are denoted by the same reference signs.

As the image data outputting process in the modified example starts, in S200, the CPU 11 determines whether the protocol used for receiving the scan command was IPP. It is known that a scan command entered through the basic reader program 222 is transmitted by use of IPP. Therefore, by determining whether the protocol having been used for receiving the scan command is IPP or not, the CPU 11 may determine whether the scan command currently received is a scan command received from the basic reader program 222 or from the scanner driver.

If the protocol used for receiving the scan command was IPP (S200: YES), in other words, if the scan command is entered through the basic reader program 222, in S201, the CPU 11 transmits the image data presence inquiry, along with the received user information, to the server 3, in the same manner as S201 in the image data outputting process shown in FIG. 4. Further, in S202, the CPU 11 determines whether the server 3 stores the image data related with the user information transmitted in S201.

If the server 3 stores the image data (S202: YES), in S211, the CPU 11 transmits the image data transmission command, along with the file name(s) received together with the reply from the server 3, to the server 3, and in S212, the CPU 11 obtains the image data from the server 3. In S213, the CPU 11 transmits the obtained image data to the sender of the scan command, and in S214, the CPU 11 transmits a delete command to delete the image data to the server 3. Thereafter, the CPU 11 ends the image data outputting process.

In S202, on the other hand, if the image data is not stored in the server 3 (S202: NO), or in S200, if the protocol used to receive the scan command was not IPP (S200: NO), in other words, if the scan command was entered through the scanner driver, in S221, the CPU 11 controls the reader device 16 to conduct the reading action, and in S222, the CPU 11 obtains a result of the reading action and generate image data. In S213, the CPU 11 transmits the generated image data to the PC 2 being the sender of the scan command By these steps, when the MFP 1 receives the scan command through the scanner driver, the MFP 1 may operate in the same manner as the conventional scanning operation.

According to the processes described above, even when the scan job is received through the basic reader program 222, the user may move to the MFP 1 with the original material and enter the scan command to read the image, and the MFP 1 may pass the image data being the result of the reading action related with the user information to the server 3. Thereafter, the user may return to the PC 2 along with the original material and enter the scan command to the MFP 1 through the PC 2. Thereby, the PC 2 may obtain the image data of the image having been read earlier through the MFP 1 from the server 3. According to the procedure, the user may obtain the result of the reading action by a single roundtrip between the PC 2 and the MFP 1. Therefore, while the user's burden may be reduced, the quasi push-scanning operation may be achieved. Moreover, the PC 2 may not necessarily be equipped with a dedicated reader application to provide a push-scanning function.

Although examples of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the image reading apparatus is not necessarily limited to the MFP but may be, for example, a single-functioned reading apparatus such as a scanner, as long as the apparatus is equipped with the image reading function. For another example, the information processing apparatus, through which the user enters the scan job, may not necessarily be limited to the PC but may be, for example, a mobile device such as a smartphone.

For another example, the information to identify a receiver of the image data from the MFP 1 may not necessarily be limited to the user information identifying the user but may be, for example, information to identify a receiver device, such as an IP address. In this regard, however, if the information to identify the receiver of the image data is the user information, the MFP 1 may accept the scan command securely based on the authentication of the user. In other words, security for the image data may be improved.

For another example, the image data for the image having been read may not necessarily be transmitted to the server 3 being an external device to be stored, but the image data may be stored in, for example, the memory 12 in the MFP 1 or a flash memory attached to the MFP 1. In this regard, however, when the storage for the image data is provided outside the MFP 1, e.g., in the external device, the memory 12 in the MFP 1 may be released from the load to keep the image data. Moreover, the server 3 may administrate the image data on the user basis; therefore, the image data may be secured in the server 3 reliably. On the other hand, when the image data is stored in the memory 12 of the MFP 1, a load on a network that may otherwise be caused by communication between the MFP 1 and the server 3 may be reduced or cleared. Therefore, for example, risks that may be caused by communication failure may be reduced.

For another example, the image data for the image having been read may not necessarily be stored uniformly in the server 3, but a storage for the image data may be designative on a user basis. For example, the MFP 1 may store information that relates user information of a user with a storage, and in the first phase, the MFP 1 may store the image data in the storage related with the user information. Moreover, in the second phase, the MFP 1 may obtain the image data from the storage related with the user information. In this arrangement, storages for image data may be decentralized, and a load on a memory in each storage may be reduced.

For another example, the MFP 1 may not necessarily inquire presence of the image data in the server 3 or obtain file name(s) of the image data before receiving the image data 3 from the server 3. For example, the MFP 1 may save information concerning history of transmission from the MFP 1 to the server 3 and determine presence or absence of the image data based on the history.

For another example, in the scan-storing process, expiration of the image data may not necessarily be monitored on the data unit basis. For example, the scan-storing process may end after S104, and separately from the scan-storing process, a timeout monitoring process, in which timeout for all of the image data units may be monitored, may be conducted periodically in either the server 3 or the MFP 1. In the timeout monitoring process, for example, a registration date for each image data unit may be recorded, and when a predetermined time for the image data unit since the registration date expires, the image data unit may be deleted.

For another example, after transmission of the image data from the server 3 to the MFP 1, the image data may not necessarily be deleted but may be saved until, for example, a user enters a delete command, or, for another example, a retention period for the image data expires. If the image data is not deleted immediately after the transmission to the MFP 1 but is saved, the image data may be obtained by the user for multiple times. On the other hand, if the image data is deleted immediately after the transmission, confidentiality of the image data may be secured, and a load on the memory in the server 3 may be reduced.

For another example, the reading action to read an image of an original material may not necessarily be started in response to the entry of the scan command in the first phase but may be started, for example, after entry of the user information, and in response to successful authentication of the user. In other words, entry of the user information may double as entry of the scan command. In this arrangement, S003 in the scan-storing process shown in FIG. 3 may be omitted. While entry of the user information doubles as entry of scan command, the user's operation may be simplified.

For another example, some or all of the steps or the processes conducted in the flowcharts described above and shown in the accompanying drawings may optionally be conducted in different orders or in parallel with one another as long as the processed results do not collide or contradict with one another.

For another example, the steps or the processes in the scanner system 100 described above may be accomplished by a single CPU, a plurality of CPUs, a hardware device such as an ASIC, or a combination of any of these. For another example, the steps or the processes in the above-described embodiments may be accomplished by various media or methods, including a recording medium storing the programs to implement the steps or the processes.

What is claimed is:

1. An image reading apparatus, comprising:
  a reader device;
  a user interface;
  a communication interface; and
  a controller configured to:
    accept entry of first receiver-identifying information identifying a receiver of image data;
    in a state where the first receiver-identifying information is entered, in response to entry of a first scan command through the user interface, the first scan command being configured to cause the reader device to read an image of an original material, control the reader device to read the image of the original material; and
    store image data for the read image in relation with the entered first receiver-identifying information in a predetermined memory area,
  wherein the communication interface is configured to receive a second scan command from an information processing apparatus connected with the image reading apparatus by use of a specific protocol, the second scan command being configured to cause the reader device to read the image of the original material, the specific protocol being a protocol to be used in a basic reader program incorporated in an operating system in the information processing apparatus, the second scan command including second receiver-identifying information identifying a receiver of image data,
wherein the controller is further configured to, in response to the communication interface receiving the second scan command including the second receiver-identifying information that corresponds to the first receiver-identifying information by identifying the same receiver from the information processing apparatus:
  read out the image data stored in relation with the first receiver-identifying information corresponding to the second receiver-identifying information included in the second scan command from the predetermined memory area; and
  transmit the image data read out from the predetermined memory area to the information processing apparatus through the communication interface.

2. The image reading apparatus according to claim 1, wherein the controller is configured to, when the communication interface receives the second scan command from the information processing apparatus, in a case where no image data related with the first receiver-identifying information corresponding to the second receiver-identifying information included in the second scan command is stored in the predetermined memory area, control the reader device to read the image of the original material and transmit the image data for the read image to the information processing apparatus through the communication interface.

3. The image reading apparatus according to claim 1, wherein the first receiver-identifying information includes user-specifying information to specify a user, the user-specifying information including authentication information to be used for authenticating the user, and
wherein, for accepting the entry of the first receiver-identifying information, the controller is configured to authenticate the user by use of the authentication information included in the entered user-specifying information, and in a case where the user is authenticated, accept the first receiver-identifying information to be entered.

4. The image reading apparatus according to claim 1, wherein the first receiver-identifying information includes user-specifying information to specify a user,
wherein the predetermined memory area is located in an external device connected to the image reading apparatus through the communication interface, the external device having a memory area for each user,
wherein the controller stores the image data in relation with the first receiver-identifying information in the memory area assigned to the user specified by the user-specifying information included in the first receiver-identifying information.

5. The image reading apparatus according to claim 1, wherein the controller stores the image data in the predetermined memory area located in a memory provided to the image reading apparatus.

6. The image reading apparatus according to claim 1, wherein the first scan command includes a first-typed first scan command and a second-typed first scan command different from the first-typed first scan command,
wherein the controller is configured to:
  in a case where the controller controls the reader device to read the image of the original material in response to accepting entry of the first-typed first scan command, store the image data for the read image in relation with the entered first receiver-identifying information in the predetermined memory area; and
  in a case where the controller controls the reader device to read the image of the original material in response to accepting entry of the second-typed first scan command, store the image data of the image data for the read image in a memory area designated by a user.

7. The image reading apparatus according to claim 1, wherein the communication interface is capable of receiving the second scan command from the information processing apparatus by use of a protocol different from the specific protocol,
wherein the controller is configured to:
  in a case where the communication interface receives the second scan command by use of the specific protocol, read out the image data from the predetermined memory area and transmit the image data read out from the predetermined area to the information processing apparatus through the communication interface; and
  in a case where the communication interface receives the second scan command by use of the protocol different from the specific protocol, control the reader device to read the image of the original material and transmit image data for the read image to the information processing apparatus through the communication interface.

8. The image reading apparatus according to claim 1, wherein the controller is configured to, in response to reading out the image data from the predetermined memory area, delete the image data from the predetermined memory area.

9. The image reading apparatus according to claim 1, wherein the controller is configured to, in a case where the image data stored in the predetermined memory area is maintained in the predetermined memory area after expiration of a predetermined time since a timing when the image data is stored, delete the image data from the predetermined memory area.

10. The image reading apparatus according to claim 1, wherein the entry of the first receiver-identifying information doubles as the entry of the first scan command, and
wherein the controller is configured to, in response to accepting the entry of the first receiver-identifying information, read out the image data from the predetermined memory area.

* * * * *